US011969309B2

(12) United States Patent
Yu et al.

(10) Patent No.: US 11,969,309 B2
(45) Date of Patent: Apr. 30, 2024

(54) TOOTH REPOSITIONING SYSTEM

(71) Applicant: 3M INNOVATIVE PROPERTIES COMPANY, St. Paul, MN (US)

(72) Inventors: Ta-Hua Yu, Woodbury, MN (US); Jennifer L. Cook, Cypress, TX (US); Karl J. L. Geisler, St. Paul, MN (US); Paul A. Sevcik, White Bear Township, MN (US); Bruce R. Broyles, Oakdale, MN (US); Jennifer K. Tully, St. Paul, MN (US)

(73) Assignee: Solventum Intellectual Properties Company, St. Paul, MN (US)

( * ) Notice: Subject to any disclaimer, the term of this patent is extended or adjusted under 35 U.S.C. 154(b) by 0 days.

(21) Appl. No.: 17/926,803

(22) PCT Filed: Jun. 28, 2021

(86) PCT No.: PCT/IB2021/055764
§ 371 (c)(1),
(2) Date: Nov. 21, 2022

(87) PCT Pub. No.: WO2022/003534
PCT Pub. Date: Jan. 6, 2022

(65) Prior Publication Data
US 2023/0200944 A1 Jun. 29, 2023

Related U.S. Application Data

(60) Provisional application No. 63/091,144, filed on Oct. 13, 2020, provisional application No. 63/046,507, filed on Jun. 30, 2020.

(51) Int. Cl.
*A61C 7/08* (2006.01)
*B32B 27/08* (2006.01)
(Continued)

(52) U.S. Cl.
CPC ................ *A61C 7/08* (2013.01); *B32B 27/08* (2013.01); *B32B 27/308* (2013.01); *B32B 27/36* (2013.01);
(Continued)

(58) Field of Classification Search
CPC ....... A61C 7/08; A61C 2201/00; B32B 27/08; B32B 27/308; B32B 27/36;
(Continued)

(56) References Cited

U.S. PATENT DOCUMENTS 5,975,893 A 11/1999 Chishti et al.
6,183,248 B1 2/2001 Chishti et al.
(Continued)

FOREIGN PATENT DOCUMENTS

CN 102793587 B 9/2018
DE 202013001392 U1 4/2013
(Continued)

OTHER PUBLICATIONS

"Stiffness", Wikipedia, [retrieved from the internet on Dec. 24, 2022], URL <https://en.wikipedia.org/wiki/Stiffness>, 2022, pp. 1-5.
(Continued)

*Primary Examiner* — Nicholas D Lucchesi
*Assistant Examiner* — Hao D Mai
(74) *Attorney, Agent, or Firm* — Kevin Weber

(57) ABSTRACT

A system for repositioning teeth a patient from an initial tooth arrangement to a final tooth arrangement includes a plurality of incremental position adjustment appliances, each having an arrangement of cavities shaped to receive and reposition teeth of the patient. The cavities in at least one appliance in the system have a different geometry than that of at least one other appliance in the system. At least some of the appliances in the system are successively worn by the (Continued)

patient to exert force on at least one tooth and move the teeth of the patient from a first arrangement to a successive arrangement different from the first arrangement. The system includes a first multilayer shell with a bending stiffness factor less than about 0.1 GPa*mm$^3$ and an elastic modulus no greater than about 1.5 GPa; and a second shell with a bending stiffness factor greater than 0.1 GPa*mm$^3$.

13 Claims, 3 Drawing Sheets

(51) Int. Cl.
*B32B 27/30* (2006.01)
*B32B 27/36* (2006.01)

(52) U.S. Cl.
CPC ....... *A61C 2201/00* (2013.01); *B32B 2250/05* (2013.01); *B32B 2250/24* (2013.01); *B32B 2307/546* (2013.01); *B32B 2535/00* (2013.01)

(58) Field of Classification Search
CPC ............ B32B 2250/05; B32B 2250/24; B32B 2307/546; B32B 2535/00
See application file for complete search history.

(56) References Cited

U.S. PATENT DOCUMENTS

| | | | |
|---|---|---|---|
| 6,483,248 B2 | 11/2002 | Nagakubo et al. | |
| 6,524,101 B1 | 2/2003 | Phan et al. | |
| 6,746,242 B1 | 6/2004 | Kesling | |
| 8,070,487 B2 | 12/2011 | Chishti et al. | |
| 8,235,713 B2 | 8/2012 | Phan et al. | |
| 9,655,691 B2 | 5/2017 | Li et al. | |
| 9,655,693 B2 | 5/2017 | Li et al. | |
| 2002/0042038 A1 | 4/2002 | Miller et al. | |
| 2002/0142258 A1 | 10/2002 | Chishti et al. | |
| 2003/0190575 A1 | 10/2003 | Hilliard | |
| 2005/0003318 A1 | 1/2005 | Choi et al. | |
| 2008/0050692 A1 | 2/2008 | Hilliard | |
| 2008/0141534 A1 | 6/2008 | Hilliard | |
| 2009/0246724 A1 | 10/2009 | Chen et al. | |
| 2009/0306327 A1 | 12/2009 | Stewart et al. | |
| 2010/0028829 A1 | 2/2010 | Lewis et al. | |
| 2011/0269092 A1* | 11/2011 | Kuo | B33Y 50/02 433/215 |
| 2013/0095446 A1 | 4/2013 | Andreiko et al. | |
| 2013/0157224 A1 | 6/2013 | Cios | |
| 2013/0266906 A1 | 10/2013 | Soo | |
| 2013/0302742 A1 | 11/2013 | Li et al. | |
| 2015/0374464 A1 | 12/2015 | Stewart | |
| 2016/0278882 A1 | 9/2016 | Kitching et al. | |
| 2016/0310237 A1 | 10/2016 | Hung | |
| 2017/0007359 A1* | 1/2017 | Kopelman | B33Y 80/00 |
| 2018/0250099 A1 | 9/2018 | Lai et al. | |
| 2021/0221107 A1* | 7/2021 | Stewart | B32B 25/14 |

FOREIGN PATENT DOCUMENTS

| | | |
|---|---|---|
| DE | 202013001393 U1 | 4/2013 |
| JP | 2009279022 A | 12/2009 |
| WO | 2017007962 A1 | 1/2017 |
| WO | 2018222864 A1 | 12/2018 |
| WO | 2019069268 A2 | 4/2019 |
| WO | 2022079544 A1 | 4/2022 |

OTHER PUBLICATIONS

International Search report for PCT International Application No. PCT/IB2021/055764 dated Sep. 9, 2021, 5 pages.

* cited by examiner

TOOTH REPOSITIONING SYSTEM

CROSS REFERENCE TO RELATED APPLICATIONS

This application is a national stage filing under 35 U.S.C. 371 of PCT/IB2021/055764, filed Jun. 28, 2021, which claims the benefit of U.S. Provisional Application No. 63/046,507, filed Jun. 30, 2020 and U.S. Provisional Application No. 63/091,144, filed Oct. 13, 2020, the disclosures of which are incorporated by reference in their entireties herein.

BACKGROUND

Orthodontic treatments involve repositioning misaligned teeth and improving bite configurations for improved cosmetic appearance and dental function. Repositioning teeth is accomplished by applying controlled forces to the teeth of a patient over an extended treatment time period.

Teeth may be repositioned by placing a dental appliance such as a polymeric incremental position adjustment appliance, generally referred to as an orthodontic aligner or an orthodontic aligner tray, over the teeth of the patient. The orthodontic alignment tray includes a polymeric shell with a plurality of cavities configured for receiving one or more teeth of the patient. The individual cavities in the polymeric shell are shaped to retain one or more teeth and the polymeric materials making up the shell are selected to exert force on one or more teeth to resiliently and incrementally reposition selected teeth or groups of teeth in the upper or lower jaw.

An orthodontic dental appliance made from a relatively stiff polymeric material with a high flexural modulus selected to effectively exert a stable and consistent repositioning force against the teeth of a patient such as, for example, polyesters and polycarbonates, can cause discomfort when the dental appliance repeatedly contacts oral tissues or the tongue of a patient over an extended treatment time. These high modulus polymeric materials can also have poor stress retention behavior, and over time the loss in repositioning force can drop below a desired level. A rubbery elastomer has excellent stress retention behavior, but in many cases may be too soft to be used alone in a dental appliance to effectively move teeth into a desired alignment condition in a reasonably short treatment time.

In some treatment systems a series of orthodontic aligner trays are provided for sequential wear by a patient during stages of the orthodontic treatment to gradually reposition teeth from misaligned tooth arrangement to a successive more aligned tooth arrangement until a desired projected tooth alignment condition is ultimately achieved. Once the desired alignment condition is achieved, an aligner tray, or a series of aligner trays, may be used periodically or continuously in the mouth of the patient to maintain a preferred tooth alignment. In addition, orthodontic retainer trays may be used for an extended time period to maintain tooth alignment following the initial orthodontic treatment.

Systematic methodology using computer-aided design to develop a series of dental incremental position adjustment polymeric aligners used sequentially to progressively reposition the teeth has gained tremendous interest for dental alignment. In some cases, the system of dental appliances includes at least two different aligner appliances formed from polymeric materials that have different elastic moduli. The polymeric materials provide each of the aligner trays with a different level of stiffness to impart a desired tooth moving force and efficacy when the appliance is worn by the patient.

SUMMARY

In one aspect, the present disclosure is directed to a system for repositioning teeth a patient from an initial tooth arrangement to a final tooth arrangement. The system includes a plurality of incremental position adjustment appliances, each having an arrangement of cavities shaped to receive and reposition teeth of the patient. The cavities in at least one appliance in the system have a different geometry than that of at least one other appliance in the system. At least some of the appliances in the system are successively worn by the patient to exert force on at least one tooth and move the teeth of the patient from a first arrangement to a successive arrangement different from the first arrangement. The system includes a first multilayer shell with a bending stiffness factor less than about 0.1 GPa*mm$^3$ as measured within 2 mm of the trimmed line of incisors on the labial side of the shell, and an elastic modulus no greater than about 1.5 GPa; and a second shell with a bending stiffness factor greater than 0.1 GPa*mm$^3$ as measured within 2 mm of the trimmed line of incisors on the labial side of the shell.

In another aspect, the present disclosure is directed to a method for moving one or more of a patient's teeth. The method includes providing a series of dental appliances for sequential placement over at least some of the teeth of the patient, wherein at least some of the dental appliances in the series include tooth retaining cavities configured to impart a resilient force to reposition at least one tooth of the patient, and wherein at least one of the dental appliances in the series has tooth retaining cavities with a geometry that differs from a geometry of the tooth retaining cavities of another dental appliance in the series. The series of dental appliances includes a first multilayer shell with a bending stiffness factor less than about 0.1 GPa*mm$^3$ as measured within 2 mm of the trimmed line of incisors on the labial side of the shell, and an elastic modulus no greater than about 1.5 GPa, wherein the first multilayer shell comprises at least one polymeric layer having an elastic modulus less than about 0.5 GPa and a bending stiffness factor less than about 0.001 GPa*mm$^3$; and a second shell with a bending stiffness factor greater than 0.1 GPa*mm$^3$ as measured within 2 mm of the trimmed line of incisors on the labial side of the shell.

In another aspect, the present disclosure is directed to a kit for orthodontic treatment. The kit includes a series of dental appliances for sequential placement over at least some of the teeth of a patient, wherein at least some of the dental appliances in the series have tooth retaining cavities configured to impart a resilient force to reposition at least one tooth of the patient, and wherein at least one of the dental appliances in the series has tooth retaining cavities with a geometry that differs from a geometry of the tooth retaining cavities of another dental appliance in the series. The series of dental appliances includes a first multilayer shell with a bending stiffness factor less than about 0.1 GPa*mm$^3$ as measured within 2 mm of the trimmed line of incisors on the labial side of the shell, and an elastic modulus no greater than about 1.5 GPa; and a second shell with a bending stiffness factor greater than 0.1 GPa*mm$^3$.

In another aspect, the present disclosure is directed to a method for making a series of dental appliances. The method includes thermoforming a first polymeric film to form a first dental appliance having an arrangement of cavities configured to retain at least one tooth of a patient, wherein the first polymeric film includes a multilayer polymeric film with at least one polymeric layer having an elastic modulus less than about 0.5 GPa and a bending stiffness factor less than about 0.001 GPa*mm$^3$; and thermoforming a second polymeric film to form a second dental appliance different from the first dental appliance.

In another aspect, the present disclosure is directed to a system for repositioning teeth of a patient from an initial tooth arrangement to a final tooth arrangement. The system includes a series of polymeric shells, wherein at least some of the polymeric shells have an arrangement of cavities configured to receive one or more teeth in an upper arch or a lower arch of the patient and apply a resilient positioning force to cause a predetermined incremental movement of one or teeth from a first position to a second position. The polymeric shells in the series includes a first multilayer shell with a bending stiffness factor less than about 0.1 GPa*mm as measured within 2 mm of the trimmed line of incisors on the labial side of the shell, and an elastic modulus no greater than about 1.5 GPa; and a second shell with a bending stiffness factor greater than 0.1 GPa*mm$^3$ as measured within 2 mm of the trimmed line of incisors on the labial side of the shell.

In another aspect, the present disclosure is directed to a method for designing an orthodontic treatment. The method includes determining, at an onset of a first phase of treatment, a first bending stiffness appropriate for a desired tooth movement in the first phase; creating a first polymeric shell appliance having either a bending stiffness factor less than about 0.1 GPa*mm$^3$ as measured within 2 mm of the trimmed line of incisors on the labial side of the shell or a bending stiffness factor greater than 0.1 GPa*mm$^3$ as measured within 2 mm of the trimmed line of incisors on the labial side of the shell; determining, prior to the onset of a second phase of treatment, a second bending stiffness factor appropriate for a desired tooth movement in the second phase; and creating a second polymeric shell appliance having either a bending stiffness factor less than about 0.1 GPa*mm$^3$ as measured within 2 mm of the trimmed line of incisors on the labial side of the shell or a bending stiffness factor greater than 0.1 GPa*mm$^3$ as measured within 2 mm of the trimmed line of incisors on the labial side of the shell.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
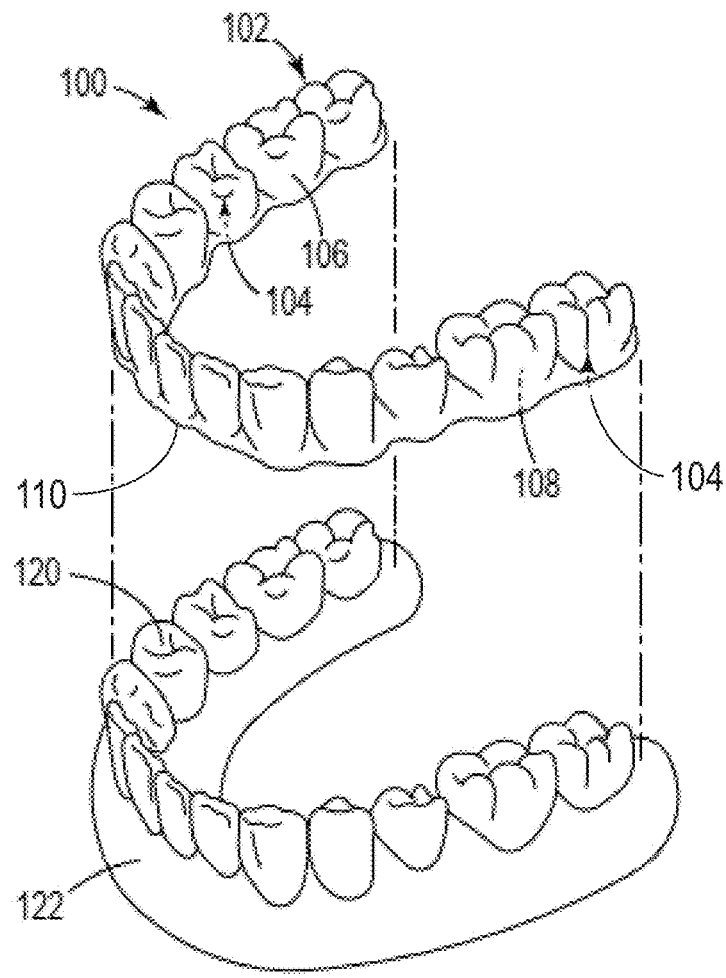
FIG. 1 is a schematic overhead perspective view of a method for using a dental alignment tray by placing the dental alignment tray to overlie teeth.

When an orthodontic aligner is worn by a patient, the aligner encapsulates the teeth and provides both retention forces and activation forces to move the teeth. In general, the contour of the dental surfaces (for example, enamel, gingiva and embrasures in interproximal spaces between teeth) provide retention force, while the elastic bending deformation of the aligner provides an active component to move the teeth. To provide effective tooth movement, the elastic bending force provided by the aligner should not overcome the retention force and should not be so great to cause undue patient discomfort.

Some treatment systems include a plurality of multilayered polymeric alignment trays with different retention and activation forces designed to be worn sequentially by a patient to achieve a final projected tooth alignment condition. In some cases, the alignment trays have been made from more flexible polymeric materials that improve patient comfort. To accelerate tooth movement in early stages of treatment, these flexible materials provide persistent activation force. However, this more flexible elastic bending force can provide less control in tailoring precise movement of the teeth of the patient near the final treatment stages to reach the final projected position. Additional refinement steps may then be needed to move the teeth to the exact final projected position as planned, which is very undesirable to both orthodontists and patients.

Flexible aligners can result in light continuous force that is more effective as described above in accelerating tooth movement involving frontal resorption. On the other hand, rigid aligners deliver heavier initial force for providing slower tooth movement involving undermining resorption. The slower tooth movement performance is undesired for the earlier stage of the treatment, but favorable in the later stage for reaching the final projected or prescribed position in a more controllable way to reduce refinement steps.

The present disclosure is directed to a system and orthodontic treatment method including a plurality of orthodontic dental appliances such as, for example, an orthodontic aligner tray or a retainer tray, configured to move or retain the position of teeth in an upper or lower jaw of a patient. To reduce refinement in the later stages of orthodontic treatment, a flexible multilayered polymeric aligner has both physical and mechanical properties selected to efficiently move teeth at the earlier stage of the treatment while another more rigid aligner material is used in the later stage of the treatment to reach a projected final position while maintaining patient comfort and the quality in patient experience.

In some embodiments, one of the orthodontic aligner trays in the treatment system includes multiple layers of high flexural modulus and low flexural modulus polymeric materials, which provides a desired average flexural modulus and is formed at a thickness selected to improve patient comfort while maintaining an acceptable level of force persistence. The combination of thermoplastic polymers in the dental appliance is also selected to provide other beneficial properties such as, for example, good stain resistance, low optical haze, and good mold release properties after the dental appliance is thermally formed from a multilayered polymeric film. Other orthodontic aligners in the treatment system include single or multiple layers of polymeric materials, which are also formed at a thickness selected to improve patient comfort while maintaining an acceptable level of tooth movement rate.

In various embodiments, at least one of the orthodontic aligner trays in the system includes at least 5 polymeric layers, with softer polymeric interior layers disposed between a harder polymeric core layer and two harder polymeric outer layers. The hard core layer can enhance dimensional stability and strain recovery, while the softer middle layers positioned close to the outer skin layers can improve patient comfort.

In some embodiments, the multilayered dental appliance is transparent or translucent, and has enhanced crack resistance and force persistence, good staining resistance, improved patient comfort and improved dimensional stability.

Referring now to FIG. 1, a shell 102 of an orthodontic appliance 100, also referred to herein as an orthodontic aligner tray, includes an outer surface 106 and an inner surface 108 with cavities 104 that generally conform to one or more of a patient's teeth 120.

In some embodiments, the cavities 104 are slightly out of alignment with the patient's initial tooth configuration, and in other embodiments the cavities 104 conform to the teeth of the patient to maintain a desired tooth configuration and/or provide anchorage. The shell 102 may be one of a group or a series of shells having substantially the same shape or mold, or incrementally different shapes, but which are formed from different polymeric materials, or different layers of polymeric materials, selected to provide a desired stiffness or resilience as needed to move the teeth of the patient. In some embodiments, the shell 102 may be one of a group or a series of shells having substantially the same shape or mold, or incrementally different shapes, but which are formed from the same polymeric materials, selected to provide a desired stiffness or resilience as needed to move the teeth of the patient. A patient may alternately use one of the orthodontic appliances during each treatment stage depending upon the patient's preferred usage time or desired treatment time period for each treatment stage. The alternating use of the appliances may be repeated as many times as necessary to effectuate the desired treatment.

No wires or other means may be provided for holding the shell 102 over the teeth 120, but in some embodiments, it may be desirable or necessary to provide individual anchors (e.g., so-called attachments) on teeth with corresponding receptacles or apertures in the shell 102 so that the shell 102 can apply a retentive or other directional orthodontic force on the tooth which would not be possible in the absence of such an anchor.

The shells 102 may be customized, for example, for day time use and night time use, during function or non-function (chewing vs. non-chewing), during social settings (where appearance may be more important) and nonsocial settings (where the aesthetic appearance may not be a significant factor), or based on the patient's desire to accelerate the teeth movement (by optionally using the more stiff appliance for a longer period of time as opposed to the less stiff appliance for each treatment stage).

For example, in one aspect, the patient may be provided with a clear orthodontic appliance that may be primarily used to retain the position of the teeth, and an opaque orthodontic appliance that may be primarily used to move the teeth for each treatment stage. Accordingly, during the daytime, in social settings, or otherwise in an environment where the patient is more acutely aware of the physical appearance, the patient may use the clear appliance. Moreover, during the evening or night time, in non-social settings, or otherwise when in an environment where physical appearance is less important, the patient may use the opaque appliance that is configured to apply a different amount of force or otherwise has an engineered configuration (e.g., more flexible or more stiff) to accelerate or control the teeth movement during each treatment stage. This approach may be repeated so that each of the pair of appliances are alternately used during each treatment stage.

The shell 102 of the orthodontic appliance 100 is an arrangement of one or more layers of polymeric materials that generally conforms to a patient's teeth, and may be transparent, translucent, or opaque. The polymeric materials can include at least one semi-crystalline polymer, typically an elastomer and are selected to provide maintain a sufficient and substantially constant stress profile during a desired treatment time, and to provide a relatively constant tooth repositioning force over the treatment time to maintain or improve the tooth repositioning efficiency of the shell 102. The shell may include a single layer of semi-crystalline polymer or multiple layers, at least one of which is a semi-crystalline polymer.

Semi-crystalline polymers can be distinguished from purely amorphous polymers in that they are composed of both crystalline and amorphous phases. The presence of crystalline regions may improve mechanical performance at elevated temperatures but tends to result in the scattering of visible light at the boundaries between crystalline and amorphous regions. Semi-crystalline polymers, typically, include a distribution of smaller crystals (for example, but not exclusively, less than 3 microns) that tend to melt a comparatively lower melting temperatures and larger crystals (for example but not exclusively greater than 3 or 4 microns) that tend to melt at comparatively higher melting temperatures. Semi-crystalline polymers can include one or more crystal melting temperature ranges determinable by MDSC™ (i.e., determinable endothermic peaks) at a constant heating rate of 4° C. per minute. Particularly suitable semi-crystalline polymers include at least a first identifiable melting temperature range with a first endothermic peak maxima and a second melting temperature range with a second endothermic peak maximum appearing at a higher temperature than the first maximum. Other semi-crystalline polymers may include three or more melting temperature ranges each with an attendant endothermic peak maximum. For example, certain copolyester elastomers, including copolyester ether elastomers available under the ECDEL brand, include a first identifiable melting temperature range ($T_{m1}$) with upper bound at about 225° C. and a endothermic peak (P1) at about 208° C., as well as a second identifiable melting temperature range ($T_{m2}$) with a lower bound greater than about 230° C. and an endothermic peak at about 240° C. In some embodiments, the semi-crystalline polymer has a first identifiable melting point range ($T_{m1}$) with a lower bound greater than about 100° C., greater than about 150° C., or greater than about 180° C. Advantageously, the methods of the present disclosure can be used to improve the optical properties of the resulting article by heating the polymer to a temperature near but below the upper bound of first melting temperature range without necessarily relying on the biaxial or monoaxial stretching of the elastomer prior to creating an appliance. Further details regarding semi-crystalline polymers and methods for controlling optical properties of an appliance may be found in U.S. Provisional Patent Application No. 63/091,144, filed Oct. 13, 2020 and incorporated in its entirety herein.

Suitable semi-crystalline polymers can include polyesters and copolyesters, which may include ethylene glycol on the polymer backbone, or be free of ethylene glycol. Other suitable semi-crystalline polymers include polyolefins and polyolefin copolymers. Other suitable semi-crystalline polymers include polyethylene (low and high density), ultra-high molecular weight polyethylene, polyamide, polypropylene, nylon, nylon copolymer, polyacryletherketone, polyimide (AURUM) and ethylene vinyl acetate (EVA). Suitable specific, semi-crystalline polymers may further include polyethylene terephthalate (PET), polybutylene terephthalate (PBT), polyetherimide, polyetheretherketone, polyethersulfone, or polytrimethylene terephthalate, polyethylene naphthalate (PEN), polycyclohexylenedimethylene terephthalate (PCT) and mixtures and combinations thereof. Copolyesters may be synthesized via condensation polymerization, melt polymerization, solid-state polymerization, or combinations thereof.

Suitable commercially available semi-crystalline polymers include: the linear low density polyethylenes sold under the BYNEL brand by Dow; the polyolefin plastomers sold under the AFFINITY brand by Dow; ethylene-octene copolymers, ethylene butene, and other polyolefin elastomers sold under the ENGAGE brand by Dow; the α-olefin copolymers sold under the TAFMER brand by Mitsui Elastomer Singapore PTE LTD; the copolymers of ethylene and (m)ethyl acrylate sold under the ELVALOY brand by Dow; the ethylene vinyl acetate copolymer resins sold under the ELVAX brand by Dow; the linear low density polyethylenes sold under the ADMER brand by Mistui, the thermoplastic polyolefins sold under the HIFLEX and CATALLOY brands by LyondellBasell Industries Holdings B.V., and those polypropylene polymers and copolymers sold under the DEXFLEX and HOSTACOM brands by LyondellBasell.

The semi-crystalline polymers of the present disclosure may also be formed with a nucleating agent. Nucleating agents induce the formation of crystals in a given polymerized polymer composition. In the methods of the present disclosure, the use of nucleating agents tends to suppress the size of crystallites formed in the polymer. Adding nucleating agents to semi-crystalline polymers can effectively decrease the dimensions of crystals by accelerating the rate of nucleation and regulating the time scale of crystallization during cooling of the melt after thermoforming; this tends to create more yet smaller crystals upon cooling. The smaller crystals can be melted and reformed at a more forgiving range of melting and/or thermoforming temperatures, enhancing the ability to routinely manufacture articles having the desired optical properties.

Suitable nucleating agents may be inorganic, organic compounds, or a mixture thereof. Nucleating agents may be included to increase the clarity of the appliance by inducing a larger number of crystals which grow to a smaller size (such that they are otherwise known as clarifying agents) and may be added in any amount effective to induce such crystal effects, for example, in amounts of from 0 to about 2% by weight (such as from about 0.1 to about 0.8% by weight) of the semi-crystalline elastomer composition. Suitable nucleating agents may include one or more of: inorganic compounds such as talc, silica, kaolin, etc.; organphosphate salts, such as salts of diesters of phosphoric acid, sodium 2,2'-methylenebis (4,6,-di-tertbutylphenyl) phosphate or aluminium-hydroxy-bis[2,2'-methylene-bis(4,6-ditbutylphenyl)phosphate; salts of monocarboxylic or polycarboxylic acids, sodium benzoate or aluminum tertbutylbenzoate; nonitol derivatives like 1,2,3-trideoxy-4, 6:5,7-bis-0[(4-propylphenyl)methylene]-nonitol; vinylcycloalkane polymers, vinylalkane polymers, and norbornane carboxylic acid salts. Presently preferred nucleating agents include sorbitol and its derivatives such as 1,3:2,4-dibenzylidene sorbitol (DBS), 1,3:2,4-Di-p-methylbenzylidene sorbitol (MDBS), and 1,3: 2,4-bis(3,4-dimethyldibenzylidene) sorbitol (DMDBS). Nucleating agents tend to increase the relative distribution of smaller (e.g., less than 3 micron) crystals in the formed elastomeric appliance, which can then be melted and reformed by thermoforming at a sufficient melting temperature.

Suitable nucleating agents include, but are not limited to, ADK STAB NA-11, NA-27, NA-902, NA-960, NA-21 and NA-71 from Amfine Chemical Corporation, Hasbrouck Heights, New Jersey, EVERCLEAR 3940 from EVERSPRIN Chemical, Taiwan, OPIMA NA210 and NA 211 from Pluss Polymer Pvt. Ltd., India, Millad 3905, 3940, 3988 and NX8000 from Milliken Chemical, Spartanburg, South Carolina, NU-510 from SamA C&I Co., Ltd., Korea.

Referring again to FIGS. 1-2, an orthodontic treatment system and method of orthodontic treatment according to the present disclosure includes applying to the teeth of a patient one or more incremental position adjustment appliances, each having substantially the same shape or mold, or incrementally different shapes. The incremental adjustment appliances may each be formed from the same or a different combination of polymeric materials, as needed for each treatment stage of orthodontic treatment. The orthodontic appliances may be configured to incrementally reposition individual or multiple teeth 120 in an upper or lower jaw 122 of a patient. In some embodiments, the cavities 104 are configured such that selected teeth will be repositioned, while other teeth will be designated as a base or anchor region for holding the repositioning appliance in place as the appliance applies the resilient repositioning force against the tooth or teeth intended to be repositioned.

Placement of the orthodontic aligner tray 100 over the teeth 120 applies controlled forces in specific locations to gradually move the teeth into the new configuration. Repetition of this process with successive appliances having different configurations eventually moves the teeth of the patient through a series of intermediate configurations to a final desired configuration, also referred to herein as a projected final configuration.

In one aspect, the present disclosure provides a system and method for orthodontic treatment that incrementally reposition teeth of a patient using a plurality of discrete polymeric orthodontic alignment or retainer trays worn sequentially by the patient. At least some of the alignment trays in the series have at least one of a shape or a flexibility different from a previous or subsequent appliance in the series. Each orthodontic aligner tray successively repositions one or more of the patient's teeth by relatively small amounts. After the alignment trays reposition the teeth to a projected tooth arrangement, one or more orthodontic retainer trays can be used to temporarily or permanently maintain the projected tooth alignment.

In the present application the flexibility of a polymeric orthodontic aligner or retainer may be defined by its bending stiffness factor, which, as shown by the equations in the examples below, is a product of the average elastic modulus of the appliance and the cube of the thickness of the appliance at a selected portion thereof. Individual appliances in the system may be configured so that their flexibility and their tooth-receiving cavities have a shape or geometry corresponding to an intermediate or end tooth arrangement intended for that appliance. In the orthodontic alignment system of the present disclosure, at least one of: (1) the shape of the alignment tray, which depends on geometry of the tooth-receiving cavities, and (2) bending stiffness factor, which depends on the modulus of the polymeric materials selected for use in forming the tray, as well as the thickness of the tray in a selected area, varies throughout a series of alignment trays according to a prescribed orthodontic treatment plan. Once a projected tooth alignment is achieved according to the orthodontic treatment plan, a retainer tray may be used to maintain the projected tooth alignment.

In the system of the present disclosure, successive individual appliances worn by the patient may have a shape or geometry differing from that of the immediately prior appliance. According to the present invention, some or all of the individual appliances may also have a bending stiffness factor differing from the bending stiffness factor of the immediately prior appliance. In some cases, individual appliances in the system may not vary in bending stiffness factor from prior or successive appliances, but only in geometry. In other cases, individual appliances in the series may vary only in bending stiffness factor (and not in geometry) when compared to immediately prior or subsequent appliances worn by the patient.

Figure 2:
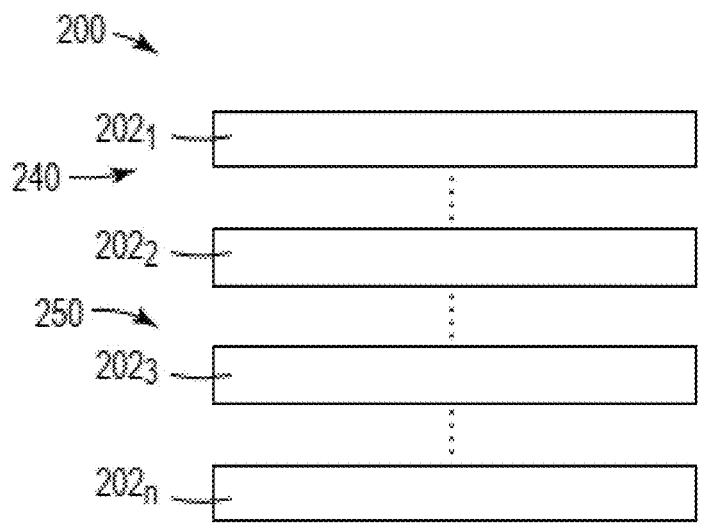
FIG. 2 is a schematic representation of an embodiment of a dental treatment system according to the present disclosure.

Referring now to the schematic representation in FIG. 2, an orthodontic alignment system includes a plurality of individual shell-like polymeric orthodontic aligner or retainer trays $202_1$ to $202_n$, each of which are configured to be worn sequentially by a patient to move at least one tooth from an initial arrangement to a final projected arrangement. The bending stiffness factor differs among at least some of the successive appliances used in the course of treatment. The bending stiffness factor of a given aligner tray 202 in the series $202_1$-$202_n$ is selected for a specific type of tooth movement, such as translating, tipping, root uprighting, rotation, extrusion, intrusion or a combination thereof. Some of the aligner trays in the series $202_1$-$202_n$ may also be configured to maintain a selected tooth alignment condition such as, for example, to maintain the final projected position of one or more teeth.

For example, since the overall stiffness of an orthodontic aligner tray is an important factor in imparting repositioning forces, an orthodontic aligner tray in the series $202_1$-$202_n$ configured for translating teeth may have a greater bending stiffness factor than a tray designed for purely rotating teeth. In another example, in some embodiments a more flexible aligner tray can be more effective in over-crowded cases, large attachment engagement and rotation treatment, while a more rigid aligner tray can be more effective in providing torque, intrusion and finishing.

In another example, light continuous force has been recognized as a more effective way in moving teeth. Therefore, at early stages of treatment, in some cases teeth can be moved more rapidly with an aligner tray having a lower bending stiffness factor, while near the end of a treatment plan a stiffer aligner tray (higher bending stiffness factor) can more precisely control the final position of the tooth from a slower tooth moving speed.

In some cases, the results derived from utilizing a series of alignment trays with different levels of stiffness can include one or more of a more predicable treatment outcome with reduced refinements at the end of the treatment, and overall improved patient comfort.

In some embodiments, at the point in the treatment plan in which a different type of tooth movement is desired, aligner trays designed for the new tooth movement may have substantially similar bending stiffness factors to each other but different from the previous appliances. Such a sequence may be repeated at any time or may continue with trays having new and different bending stiffness factors to produce different prescribed tooth movements.

Each orthodontic aligner or retainer tray 202 in the series $202_1$-$202_n$ can differ slightly in at least one of shape, tooth geometry, or bending stiffness factor, and represents a stage in the overall treatment plan. In one embodiment, which is not intended to be limiting, some of the aligner or retainer trays in the series can include a substantially uniform bending stiffness factor chosen for a specific type of tooth movement, and may vary in shape or tooth geometry. For example, in one stage of the treatment, some of the appliances may be configured to for translation of one or more teeth, and may require a relatively high bending stiffness factor. At a different stage of the treatment, the orthodontic aligner or retainer tray may be configured to achieve a different type of tooth movement, such as tipping, and may have a lower bending stiffness factor than the tray utilized for translation. The trays 202 in the series $202_1$-$202_n$ may thus have differing shape or tooth geometries to create such movements, but the elastic modulus may differ from the prior or subsequent trays utilized in the treatment.

A first multilayered polymeric aligner tray 240 in the series $202_1$-$202n$ has an elastic modulus no greater than about 1.5 GPa, and is formed with a thickness sufficient to provide an average bending stiffness factor less than about 0.1 GPa*mm3 as measured at within 2 mm of the trimmed line of central incisors (110 in FIG. 1) on the labial side. In the present application, all recited bending stiffness factor values for formed polymeric aligner trays 240 are measured within 2 mm of the trimmed line of the portion of the dental appliance configured to fit over the central incisors on the labial side of the appliance in an occlusal direction or any non-lateral direction. In some embodiments, the first alignment tray 240 includes at least one layer derived from a polymeric film with an elastic modulus less than 0.5 GPa and a thickness selected to provide a bending stiffness factor of less than 0.001 GPa*mm3. The modulus was tested according to ASTM D790 and tensile properties by ASTM D638. The specimen made by die cutting was placed in the grips of a universal testing machine. The stress-strain curve was then utilized to determine the modulus and elongation at break.

A second alignment tray 250 in the series $202_1$-$202_n$, which may be a single layer or multilayered, is chosen from a polymeric material having an elastic modulus and a thickness sufficient to provide an average bending stiffness factor greater than 0.042 GPa*mm$^3$ as measured at within 2 mm of the trimmed line of central incisors on the labial side. In some embodiments, the second alignment tray 250 has an elastic modulus of about 2 GPa and is formed with a thickness sufficient to provide an average bending stiffness factor of about 0.1 GPa*mm$^3$ as measured at within 2 mm of the trimmed line of central incisors on the labial side.

Figure 3:
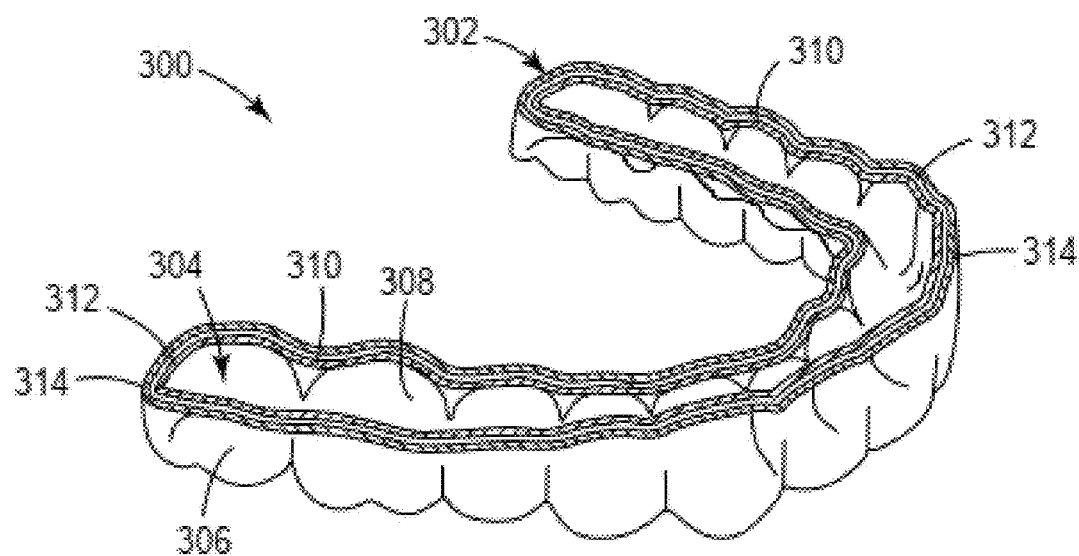
FIG. 3 is a schematic overhead perspective view of an embodiment of a multilayered dental appliance suitable for used in an embodiment of the dental treatment system of FIG. 2.

FIG. 3 illustrates an example, which is not intended to be limiting, of a multilayered alignment tray 300 that may be utilized as the first alignment tray 240 in an orthodontic alignment system in the series $202_1$-$202_n$, of FIG. 2. The alignment tray 300 includes a shell 302 with an arrangement of one or more layers of elastic polymeric materials that generally conforms to a patient's teeth, and may be transparent, translucent, or opaque. The polymeric materials in the one or more layers are selected to provide a bending stiffness factor in selected regions of the shell 302 to maintain a sufficient and substantially constant stress profile during a desired treatment time, and to provide a relatively constant tooth repositioning force over the treatment time to maintain or improve the tooth repositioning efficiency of the shell 302.

In the embodiment of FIG. 3, an arrangement of one or more polymeric layers 314, which also may be referred to herein as skin layers, forms an external surface 306 of the shell 302. The external surface 306 contacts the tongue and cheeks of a patient. An arrangement of one or more polymeric layers 310, which may also be referred to herein as skin layers, forms an internal surface 308 of the shell 302. The internal surface 308 contacts the teeth of a patient. An arrangement of one or more internal polymeric layers 312 resides between the polymeric layers 310 and 314.

Figure 4:
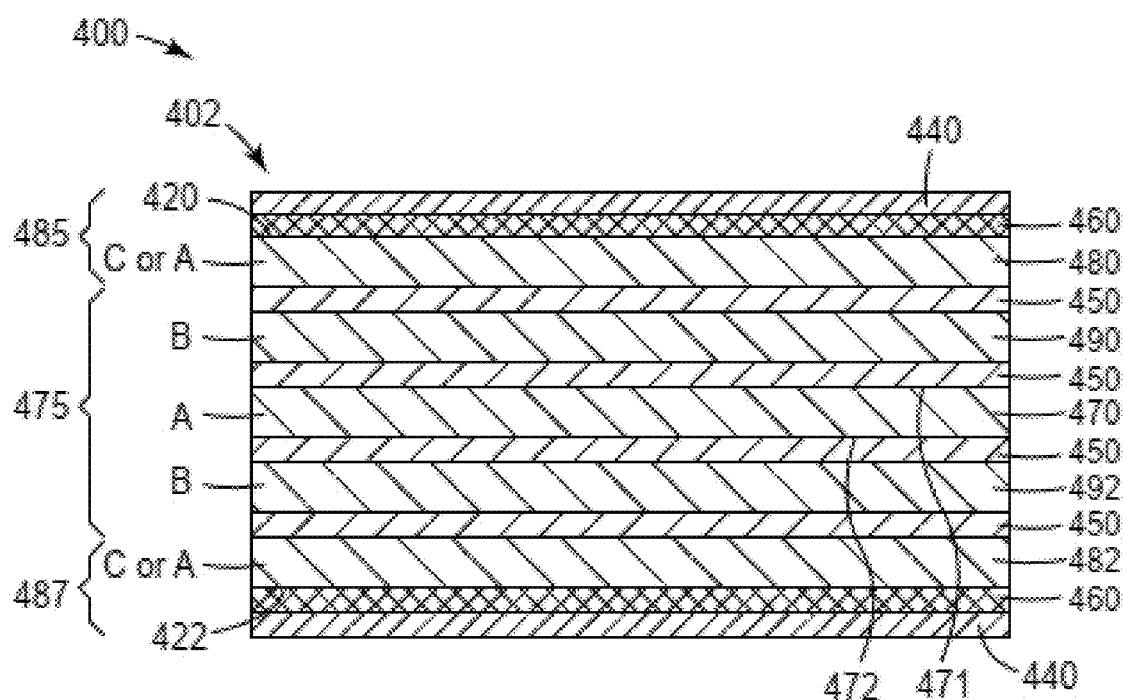
FIG. 4 is a schematic, cross-sectional view of an embodiment of a multilayered dental appliance of FIG. 3.

FIG. 4 shows a schematic cross-sectional view of an embodiment of another multilayered dental appliance 400 that may be utilized as the first alignment tray 240 in an orthodontic alignment system in the series $202_1$-$202_n$, of FIG. 2. The dental appliance 400 of FIG. 4, includes a polymeric shell 402 with a multilayered polymeric structure. The polymeric shell 402 includes at least 3, or at least 5, or at least 7, alternating layers of thermoplastic polymers AB. The polymeric shell 402 includes an interior region 475 including a core layer 470 with a first major surface 471 and a second major surface 472. The interior region 475 further includes interior layers 490, 492 arranged on the first major surface 471 and the second major surface 472, respectively, of the core layer 470. The polymeric shell further includes exterior regions 485, 487 on opposed sides of the interior region 475. The exterior regions, which may also be referred to herein as skin layers, include first and second external surface layers 480, 482, which face outwardly on the exposed surfaces of the polymeric shell 402.

The multilayered polymeric shell 402 has an overall flexural modulus necessary to move the teeth of a patient as required in at least one step of the orthodontic aligner system. In various embodiments, the polymeric shell 402 has an overall elastic modulus of greater than about 0.5 GPa, or about 0.8 GPa to about 1.5 GPa, or about 1.0 GPa to about 1.3 GPa. In various embodiments, the multilayered polymeric shell 402 should be formed with a thickness sufficient to provide an average bending stiffness factor of less than 0.1 GPa*mm$^3$ as measured at within 2 mm of the trimmed line of central incisors on the labial side.

In some embodiments, the interfacial adhesion between any of the adjacent layers in the polymeric shell 402 is greater than about 150 grams per inch (6 grams per mm), or greater than about 500 grams per inch (20 grams per mm).

In the embodiment of FIG. 4, the core layer 470 includes one or more layers of a thermoplastic polymer A with a thermal transition temperature of about 70° C. to about 140° C., or about 80° C. to about 120° C., and a flexural modulus greater than about 1.3 GPa, or greater than about 1.5 GPa, greater than about 1.6 GPa, or greater than about 2 GPa. In some embodiments, the thermoplastic polymer A has an elongation at break of greater than about 100%. In various embodiments, the core layer 470 of the thermoplastic polymer A should have a thickness sufficient to provide a bending stiffness factor of greater than about 0.02 GPa*mm$^3$.

In various embodiments, which are not intended to be limiting, the thermoplastic polymer A may include a polyester or a copolyester, which may include linear, branched or cyclic segments on the polymer backbone. Suitable polyesters and copolyesters may include ethylene glycol on the polymer backbone or be free of ethylene glycol. Suitable polyesters include, but are not limited to, copolyesters with no ethylene glycol available under the trade designation TRITAN from Eastman Chemical, Kingsport, TN, polyethylene terephthalate (PET), polyethylene terephthalate glycol (PETg), polycyclohexylenedimethylene terephthalate (PCT), poly(1,4 cyclohexylenedimethylene) terephthalate (PCTA), polycyclohexylenedimethylene terephthalate glycol (PCTg), polycarbonate (PC), and mixtures and combinations thereof. Suitable PETg resins, which contain no ethylene glycol on the polymer backbone, can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany. For example, Eastar GN071 PETg resins and PCTg VM318 resins from Eastman Chemical have been found to be suitable.

In one embodiment, the first and second external surface layers 480, 482, which may be the same or different, each include one or more layers of the thermoplastic polymer A utilized in the core layer 470. However, in various embodiments the first and second external surface layers 480, 482 of the thermoplastic polymer A should have a thickness selected to provide a bending stiffness factor of less than about 0.002 GPa*mm$^3$.

In another embodiment, the first and the second external surface layers 480, 482 may include at one or more layers of a thermoplastic polymer C, different from the thermoplastic polymer A, wherein the thermoplastic polymer C has a thermal transition temperature of about 70° C. to about 140° C., or about 80° C. to about 120° C., and a flexural modulus greater than about 1.3 GPa, or greater than about 1.5 GPa, greater than about 1.6 GPa, or greater than about 2 GPa. In some embodiments, the thermoplastic polymer C has an elongation at break of greater than about 100%. In various embodiments, the first and second external surface layers 480, 482 of the thermoplastic polymer C should have a thickness selected to provide a bending stiffness factor of less than about 0.002 GPa*mm$^3$.

For example, in some embodiments the thermoplastic polymer C may include a polyester or a copolyester, which may be linear, branched, or cyclic. Suitable polyesters include, but are not limited to, copolyesters available under the trade designation Tritan from Eastman Chemical, Kingsport, TN, polyethylene terephthalate (PET), polyethylene terephthalate glycol (PETg), polycyclohexylenedimethylene terephthalate (PCT), poly(1,4 cyclohexylenedimethylene) terephthalate (PCTA), polycyclohexylenedimethylene terephthalate glycol (PCTg), polycarbonate (PC), and mixtures and combinations thereof. Suitable PETg and PCTg resins can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany. For example, Eastar GN071 PETg resins and PCTg VM318 resins from Eastman Chemical have been found to be suitable.

The interior layers 490, 492, which may be the same or different, each include one or more layers of a thermoplastic polymer B, different from the thermoplastic polymer A, wherein the thermoplastic polymer B has a glass transition temperature of less than about 0° C. as measured by DSC (differential scanning calorimeter) according to ASTM D3418, a vicat softening temperature of greater than 65° C., or greater than about 100° C., as measured according to ASTM D1525, and a flexural modulus less than about 0.5 GPa, or less than about 0.25 GPa, or less than about 0.2 GPa, or less than about 0.1 GPa (i.e., typically having a modulus alone insufficient to move teeth absent the presence of layer(s) A and/or C). In some embodiments, the thermoplastic polymers B have a melting temperature of greater than about 70° C., or greater than about 100° C., greater than about 150° C., or greater than about 200° C. In some embodiments, the thermoplastic polymers B have an elongation at break of greater than about 300%, or greater than about 400%. In some embodiments, the ratio of elongation at break of polymers B to either of polymers A and C is no greater than about 5, or no greater than about 3. In various embodiments, the interior layers 490, 492, of the thermoplastic polymer B should have a thickness selected to provide a bending stiffness factor of less than about 0.001 GPa*mm³.

In various embodiments, which are not intended to be limiting, the thermoplastic polymers B in the interior layers 490, 492 are independently chosen from copolyester ether elastomers, copolymers of ethylene acrylates and methacrylates, ethylene methyl-acrylates, ethylene ethyl-acrylates, ethylene butyl acrylates, maleic anhydride modified polyolefin copolymers, methacrylic acid modified polyolefin copolymers, ethylene vinyl alcohol (EVA) polymers, styrenic block copolymers, ethylene propylene copolymers, and thermoplastic polyurethanes (TPU).

In some embodiments, the thermoplastic polymers B are chosen from copolyester ether elastomers, which may be linear, branched, or cyclic. Suitable examples include materials available under the trade designation Neostar such as, for example, FN007, and Ecdel from Eastman Chemical, copolyester and copolymers of ethylene and methyl acrylate available from DowDuPont, Midland, MI under the trade designation Hytrel, Elvaloy, ethylene vinyl alcohol (EVA) polymers, and the like, and Arnitel from DSM Engineering Materials, Evansville, IN. In various embodiments, suitable thermoplastic polyurethane (TPU) polymer for the interior layers 490, 492 of the polymeric shell 202 have a flexural modulus less than about 0.24 GPa, or less than about 0.12 GPa.

In one embodiment, the TPU includes monomeric units derived from a polyisocyanate, at least one dimer fatty diol, and an optional hydroxyl-functional chain extender. In some embodiments, the TPU polymer includes hard microdomains formed by reaction between the polyisocyanate and the optional chain extender, as well as soft microdomains formed by reactions between the polyisocyanate and the dimer fatty diol.

The dimer fatty diols used to form the TPU are derived from dimer fatty acids, which are dimerization products of mono or polyunsaturated fatty acids and/or esters thereof. The related term trimer fatty acid similarly refers to trimerization products of mono- or polyunsaturated fatty acids and/or esters thereof.

Dimer fatty acids are described in, for example, T. E. Breuer, *Dimer Acids*, in J. I. Kroschwitz (ed.), Kirk-Othmer Encyclopedia of Chemical Technology, 4th Ed., Wily, N.Y., 1993, Vol. 8, pp. 223-237. The dimer fatty acids are prepared by polymerizing fatty acids under pressure, and then removing most of the unreacted fatty acid starting materials by distillation. The final product usually contains some small amounts of mono fatty acid and trimer fatty acids, but is mostly made up of dimer fatty acids. The resultant product can be prepared with various proportions of the different fatty acids as desired.

The dimer fatty acids used to form the dimer fatty diols are derived from the dimerization products of C10 to C30 fatty acids, C12 to C24 fatty acids, C14 to C22 fatty acids, C16 to C20 fatty acids, and especially C18 fatty acids. Thus, the resulting dimer fatty acids include from 20 to 60, 24 to 48, 28 to 44, 32 to 40, and especially 36 carbon atoms.

The fatty acids used to form the dimer fatty diols may be selected from linear, branched, or cyclic fatty acids, which may be saturated or unsaturated. The fatty acids may be selected from fatty acids having either a cis/trans configuration, and may have one or more than one unsaturated double bond. In some embodiments, the fatty acids used are linear monounsaturated fatty acids. The fatty acids may be hydrogenated or non-hydrogenated, and in some cases a hydrogenated dimer fatty residue may have better oxidative or thermal stability which may be desirable in a polyurethane.

In some embodiments, suitable dimer fatty acids can be the dimerization products of fatty acids including, but not limited to, oleic acid, linoleic acid, linolenic acid, palmitoleic acid, or elaidic acid. In particular, suitable dimer fatty acids are derived from oleic acid. The dimer fatty acids may be dimerization products of unsaturated fatty acid mixtures obtained from the hydrolysis of natural fats and oils, e.g. sunflower oil, soybean oil, olive oil, rapeseed oil, cottonseed oil, or tall oil In various embodiments, the molecular weight (weight average) of the dimer fatty acids used to make the TPU polymer described herein is 450 to 690, or 500 to 640, or 530 to 610, or 550 to 590.

In addition to the dimer fatty acids, dimerization usually results in varying amounts of trimer fatty acids, oligomeric fatty acids, and residues of monomeric fatty acids, or esters thereof, being present. In various embodiments, the dimer fatty acid used to make the dimer fatty diol should have a relatively low amount of these additional dimerization products, and the dimer fatty acid should have a dimer fatty acid (or dimer) content of greater than 80 wt %, or greater than 85 wt %, or greater than 90 wt %, or greater than 95 wt %, or up to 99 wt %, based on the total weight of polymerized fatty acids and mono fatty acids present.

Any of the above dimer fatty acid may be converted to a dimer fatty diol, and the resulting dimer fatty diol may have the properties of the dimer fatty acids described herein, except that the acid groups in the dimer fatty acid are replaced with hydroxyl groups in the dimer fatty diol. The dimer fatty diol may be hydrogenated or non-hydrogenated.

In some embodiments, which are not intended to be limiting, the dimer fatty diol is derived from a fatty acid with a C18 alkyl chain. In one embodiment, the dimer fatty diol is a C36 diol available from Croda, Inc., New Castle, DE, under the trade designation Pripol 2033. One depiction of the structure of Pripol 2033 is shown below:

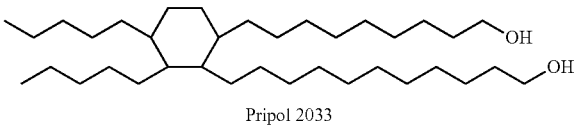 [SMILES: CCCCCC1CCC(CCCCCCCCCO)C(CCCCCCCCCCCO)C1CCCCC]

Pripol 2033

The polyisocyanate reactant used to make the TPU polymer includes at least one isocyanate with a functionality of at least 2, and in various embodiments may be an aliphatic isocyanate, such as hexamethylene 1,6-diisocyanate or isophorone diisocyanate (IPDI), or an aromatic isocyanate.

In some embodiments, the polyisocyanate is a an aromatic isocyanate, and suitable examples include, but are not limited to, toluene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, modified compounds thereof such as uretonimine-modified compounds thereof, and mixtures and combinations thereof.

In one embodiment, the isocyanate component includes 4,4'-diphenylmethane diisocyanate (MDI), or a mixture of MDI and a uretonimine-modified 4,4'-diphenylmethane diisocyanate (modified MDI).

The optional hydroxyl-functional chain extender has two or more active hydrogen groups and in some embodiments includes polyols such as ethylene glycol, diethylene glycol, propylene glycol, 1,4-butylene glycol, 1,5-pentylene glycol, methylpentanediol, isosorbide (and other iso-hexides), 1,6-hexylene glycol, neopentyl glycol, trimethylolpropane, hydroquinone ether alkoxylate, resorcinol ether alkoxylate, glycerol, pentaerythritol, diglycerol, and dextrose; dimer fatty diol; aliphatic polyhydric amines such as ethylenediamine, hexamethylenediamine, and isophorone diamine; aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine, diisopropanolamine, and mixtures and combinations thereof.

In various embodiments the hydroxyl-functional chain extender is a polyol, particularly a diol with an aliphatic linear or branched carbon chain having from 1 to 10, or 3 to 7 carbon atoms. Suitable diols include, but are not limited to, ethylene glycol, propylene glycol, diethylene glycol, propylene glycol, 1,4-butylene glycol, 1,5-pentylene glycol, 1,6 hexylene glycol (1,6 hexane diol), methylpentanediol, isosorbide (and other iso-hexides), and mixtures and combinations thereof.

In some embodiments, the TPU may most conveniently be prepared by a reactive extrusion process in which a polymeric reactive extrusion composition including the polyisocyanate, at least one dimer fatty diol, the optional hydroxyl-functional chain extender, and any other optional components such as crosslinkers, catalysts, and the like are loaded into an extruder and extruded from an appropriate die to form a layer in a multilayered polymeric film. In some embodiments, the multilayered film may later be thermoformed into a dental appliance with tooth-retaining cavities. In another embodiment, the reactive extrusion composition including the TPU may be injected into a mold.

Referring again to FIG. 4, the polymeric shell 402 further includes additional optional performance enhancing layers that can be included to improve properties of the shell 402. In various embodiments, which are not intended to be limiting, the performance enhancing layers can be, for example, barrier layers that are resistant to staining and moisture absorption; abrasion-resistant layers; cosmetic layers that may optionally include a colorant, or may include a polymeric material selected to adjust the optical haze or visible light transparency of the polymeric shell 402; tie layers that enhance compatibility or adhesion between layers AB or BC, elastic layers to provide a softer mouth feel for the patient; thermal forming assistant layers to enhance thermoforming, layers to enhance mold release during thermoforming, and the like.

The performance enhancing layers may include a wide variety of polymers selected to provide a particular performance benefit, but the polymers in the performance enhancing layers are generally selected from materials that are softer and more elastic that the polymers ABC. In various embodiments, which are not intended to be limiting, the performance enhancing layers include thermoplastic polyurethanes (TPU) and olefins.

In some non-limiting examples, the olefins in the performance enhancing layers are chosen from polyethylene (PE), polypropylene (PP), polymethylpentene (PMP), cyclic olefins (COP), copolyolefins with moieties chosen from ethylene, propylene, butene, pentene, hexene, octene, C2-C20 hydrocarbon monomers with polymerizable double bonds, and mixtures and combinations thereof; and olefin hybrids chosen from olefin/anhydride, olefin/acid, olefin/styrene, olefin/acrylate, and mixtures and combinations thereof.

For example, in the embodiment of FIG. 4, the polymeric shell 402 includes an optional moisture barrier layer 440 on each external surface, which can prevent moisture intrusion into the underlying polymeric layers, which can maintain for the shell 402 a substantially constant stress profile during a treatment time. The polymeric shell 402 further includes optional tie or thermoforming assist layers 450, which can be the same or different, between individual layers AB or BC. In some embodiments, the tie/thermoforming assist layers 450 can improve compatibility between the polymers in the layers AB or BC as the polymeric shell 402 is formed from a multilayered polymeric film, or reduce delamination between layers AB or BC and improve the durability and crack resistance of the polymeric shell 402 over an extended treatment time. The polymeric shell 402 in FIG. 4 further includes optional elastic layers 460, which can be the same or different, and can be included to improve the softness or mouth feel of the shell 402. In the embodiment of FIG. 4, the elastic layers 460 are located proximal the major surfaces 420, 422 of the shell 402.

Figure 5:
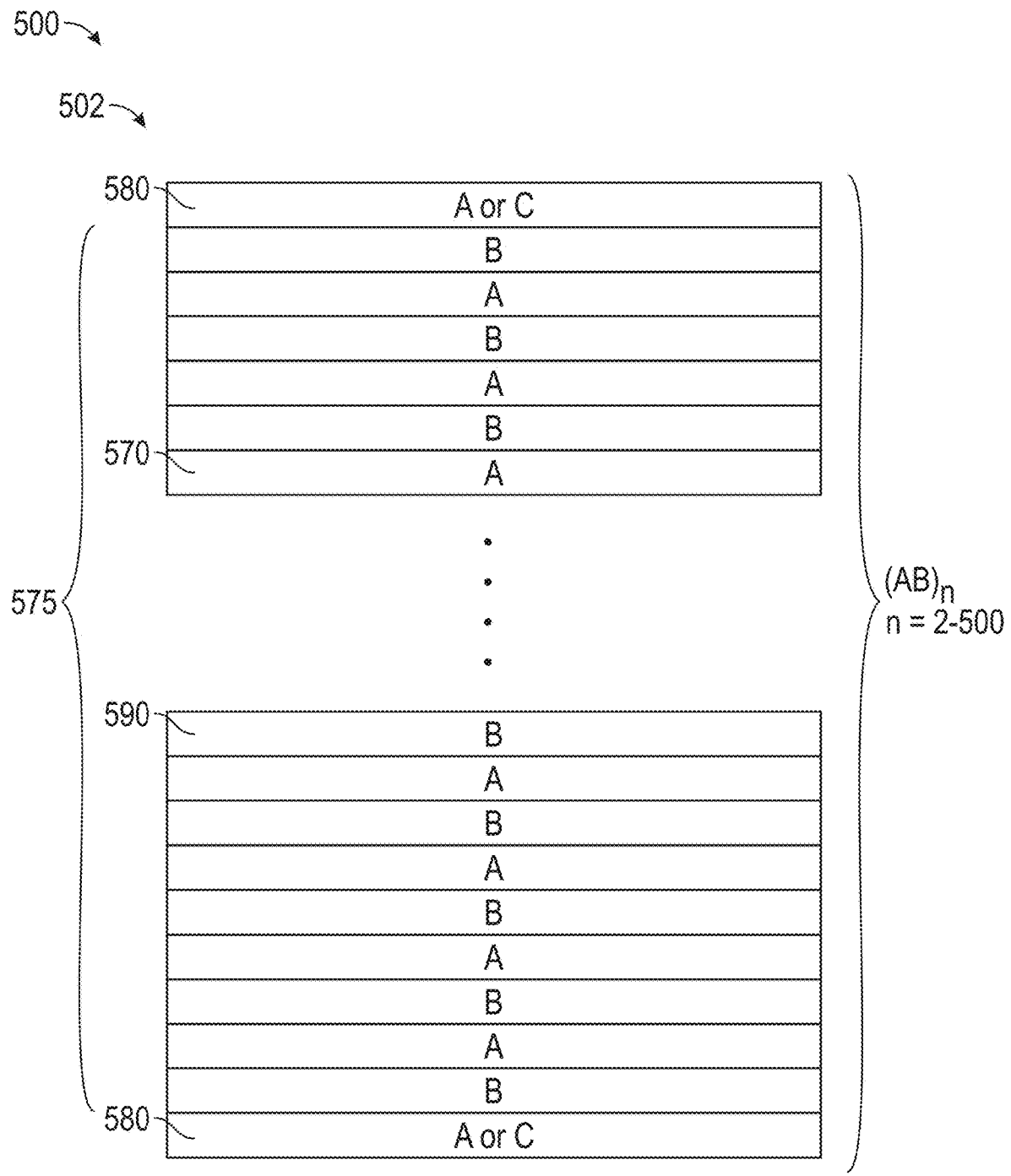
FIG. 5 is a schematic, cross-sectional view of an embodiment of a multilayered dental appliance of FIG. 3.

FIG. 5 is a schematic cross-sectional view of another embodiment of a dental appliance 500 that may be utilized as the first alignment tray 240 in an orthodontic alignment system in the series $202_1$-$202_n$, of FIG. 2. The dental appliance 500 includes a polymeric shell 502 with an interior region 575 having a multilayered polymeric structure $(AB)_n$, wherein n=2 to about 500, or about 5 to about 200, or about 10 to about 100. The layers AB include core layers 570, 590 of the thermoplastic polymers A and B discussed above with respect to FIG. 4, and are configured with thicknesses appropriate to provide the respective bending thickness factors outlined above. In some embodiments, the external layers 580 of the polymeric shell 502 can include one or more layers of either of the thermoplastic polymers A or C discussed above.

Referring again to FIG. 3, in some embodiments, the polymeric shell 302 is formed from substantially transparent polymeric materials. In this application the term substantially transparent refers to materials that pass light in the wavelength region sensitive to the human eye (about 400 nm to about 750 nm) while rejecting light in other regions of the electromagnetic spectrum. In some embodiments, the reflective edge of the polymeric materials selected for the shell 302 should be above about 750 nm, just out of the sensitivity of the human eye.

In some embodiments, any or all of the layers of the polymeric shell 302 can optionally include dyes or pigments to provide a desired color that may be, for example, decorative or selected to improve the appearance of the teeth of the patient.

Referring again to FIG. 2, the second alignment tray 250 in the series $202_1$-$202_n$, which may be a single layer or multilayered, can be chosen from any polymeric material having an elastic modulus and a thickness sufficient to provide an average bending stiffness factor greater than 0.042 GPa*mm$^3$. In some embodiments, which are not intended to be limiting, the second alignment tray 250 has an elastic modulus of about 2 GPa and is formed with a thickness sufficient to provide an average bending stiffness factor of about 0.1 GPa*mm$^3$ at within 2 mm of the trimmed line of incisors on the labial side In some example embodiments, which are not intended to be limiting, the second alignment tray 250 in the series $202_1$ to $202_n$ can include a polyester or a copolyester, which may include linear, branched or cyclic segments on the polymer backbone. Suitable polyesters and copolyesters may include ethylene glycol on the polymer backbone, or be free of ethylene glycol. Suitable polyesters include, but are not limited to, copolyesters with no ethylene glycol available under the trade designation Tritan from Eastman Chemical, Kingsport, TN, polyethylene terephthalate (PET), polyethylene terephthalate glycol (PETg), polycyclohexylenedimethylene terephthalate (PCT), poly(1,4 cyclohexylenedimethylene) terephthalate (PCTA), polycyclohexylenedimethylene terephthalate glycol (PCTg), polycarbonate (PC), and mixtures and combinations thereof. Suitable PETg resins, which contain no ethylene glycol on the polymer backbone, can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany. For example, Eastar GN071 PETg resins and PCTg VM318 resins from Eastman Chemical have been found to be suitable. The first and the second orthodontic appliances 240, 250 in the series $202_1$-$202_i$ may be made using a wide variety of techniques. In one embodiment, a suitable configuration of tooth (or teeth)—retaining cavities are formed in a substantially flat sheet of a single layer, or a multilayered polymeric film that includes layers of polymeric material arranged like the configurations discussed described above. In some embodiments, the polymeric film may be formed in a dispersion and cast into a film, or applied on a mold with tooth-receiving cavities. In some embodiments, the polymeric film may be prepared by extrusion of polymeric layer materials through an appropriate die to form the film. In some embodiments, a reactive extrusion process may be used in which one or more polymeric reaction products are loaded into the extruder to form one or more layers during the extrusion procedure.

In some embodiments, the polymeric film may later be thermoformed into a dental appliance with tooth-retaining cavities, injected into a mold including tooth-retaining cavities, or produced using a three-dimensional (3D) printing process. The tooth-retaining cavities may be formed by any suitable technique, including thermoforming, laser processing, chemical or physical etching, and combinations thereof, but thermoforming has been found to provide good results and excellent efficiency. In some embodiments, the polymeric film is heated prior to forming the tooth-retaining cavities, or a surface thereof may optionally be chemically treated such as, for example, by etching, or mechanically embossed by contacting the surface with a tool, prior to or after forming the cavities.

A general process for thermoforming an appliance using the semi-crystalline polymer containing films of the present disclosure can share similarities with common thermoforming techniques. One, some, or all of the steps of method may be performed in a temperature and pressure controlled chamber. At the outset, a physical, dental model of the patient's teeth in a target or current arrangement is provided. A sheet of material including at least one layer comprised of a semi-crystalline polymer is provided and placed over the dental model. The model and the sheet of material are placed under a first pressure and heated to a first temperature near, but preferably below, the upper bound of the first identifiable melt temperature range ($T_{m1}$) of the semi-crystalline polymer. In particularly suitable methods, the model and the sheet of material are placed under a first pressure and heated to a first temperature near, but preferably below, the endothermic peak maxima (P1) of the first identifiable melt temperature range ($T_{m1}$). The combination of heat and pressure/or vacuum causes the material to soften. The model and sheet are maintained at the first temperature and pressure until such time as the sheet has conformed to the shape and orientation of the dental model and some of the crystalline structures in the polymer have melted. The temperature is subsequently decreased (preferably isobarically) to create a shell appliance in a configuration having a geometry corresponding to the dental arrangement of the first model. In some embodiments, the polymeric film including one or more semi-crystalline polymers is heated to a temperature above the $T_g$, for example, above 120° C., about 130° C., about 140° C., during the forming process. Typically, the first temperature is at least about 5° C. below the upper bound of a first identifiable melting temperature range ($T_{m1}$) of at least one of the one or more semi-crystalline polymers present in the film (e.g., about 200° C. to about 220° C.). However, various temperatures and times may be utilized. By heating near but below the upper bound of the first identifiable melt temperature range ($T_{m1}$), a sufficient number of seed crystals or nucleating sites remain in the semi-crystalline polymer to allow for heterogenous crystal formation on cooling. The heterogenous crystal formation will allow the crystalline phase of the cooled semi-crystalline polymer to retain the desired mechanical performance while reducing the haze of the article. In other embodiments, the molding temperature is at least about 6° C. below the first identifiable melting temperature ($T_{m1}$) of at least one of the one or more semicrystalline polymers present in the film, in some embodiments at least 7° C., at least 8° C., at least 9° C., at least 10° C., at least 11° C., at least 12° C. The likelihood of melting but allowing heterogeneous nucleation upon cooling is enhanced by the addition of a nucleating agent to the one or more semi-crystalline polymer layers, as noted above.

Heating to a temperature near the first melting peak but above the glass transition of the film can typically allow for at least 80%, at least 81%, at least 82%, at least 83%, at least 84%, and least 85%, at least 86%, at least 87%, at least 88%, at least 89%, at least 90% of the crystals present in the one or more semi-crystalline elastomers to be melted as the molding temperature nears the upper bound of the first identifiable melt temperature ($T_{m1}$) and or the endothermic peak maximum (P1). The degree of melt can be determined by a melt fraction ratio for each example. Keeping the molding temperature below the upper bound if not the endothermic peak maximum, however, allows at least some of the crystalline structures or nucleating sites to remain in the film prior to cooling. In some embodiments, the pressure applied is greater than 10 kPa, e.g., greater than 50 kPa, 75 kPa, 100 kPa, 125 kPa, or greater than 150 kPa. In some embodiments, the pressure is maintained for greater than 30 seconds, e.g., greater than 45 seconds, 60 seconds, 2.5 minutes, 5.0 minutes, 10 minutes, 20 minutes, 30 minutes, 60 minutes, greater than 90 minutes, or even greater than 120 minutes, before release of pressure back to nominal atmospheric pressure. The pressure may be applied by direct force on the polymeric film material and/or vacuum. A first plurality of crystalline structures is formed in any semi-crystalline polymeric material as the temperature is reduced from first molding temperature to a subsequent temperature (e.g., room temperature). The crystalline structures formed help hold the appliance in a stored geometry prior to irradiation or other suitable method of creating crosslinks in the polymeric material and are preferably sufficiently small so as not to contribute to a hazy appearance. In some or all embodiments, the temperature is gradually reduced. In other embodiments, appliance may be quenched by rapid reduction in temperature. In any event, it is presently preferred that the parameters selected remain consistent for each appliance For example, the rate of temperature reduction could be in the range of about 0.5° C. to about 10° C. per minute, but is typically held at the same rate within the range for each temperature reduction step in the process. The multilayered polymeric film, the formed dental appliance, or both, may optionally be crosslinked with radiation chosen from ebeam, gamma, UV, and mixtures and combinations thereof.

Irradiation, if used to crosslink the material, can be done at room temperature or at elevated temperatures typically below the first molding temperature. Irradiation can be performed in air, in vacuum, or in oxygen-free environment, including inert gases such as nitrogen or noble gases. Irradiation can be performed by using electron-beam, gamma irradiation, or x-ray irradiation. In some embodiments, an ionizing radiation (e.g., an electron beam, x-ray radiation or gamma radiation) is employed to crosslink the non-segmented, polymeric material. In specific embodiments, gamma radiation is employed to crosslink the substantially non-crosslinked polymeric material. In some embodiments, the irradiating (with any radiation source) is performed until the sample receives a dose of at least 0.25 Mrad (2.5 kGy), e.g., at least 1.0 Mrad (10 kGy), at least 2.5 Mrad (25 kGy), at least 5.0 Mrad (50 kGy), or at least 10.0 Mrad (100 kGy). In some embodiments, the irradiating is performed until the sample receives a dose of between 1.0 Mrad and 6.0 Mrad, e.g., between 1.5 Mrad and 4.0 Mrad. In other embodiments, the appliance is treated to create chemical crosslinks using methods known in the art. For example, peroxides can be added to the polymer, and the polymer can be maintained at an elevated temperature after forming into the first stored geometry to allow the peroxides to react. In addition, silanes can be grafted to a polymer backbone, such as polyethylene, and the polymer can be crosslinked upon exposure to a hot, humid environment. The thickness of the multilayer polymer film is chosen to provide a clinically appropriate thickness of the material in the resultant appliance. The thickness of the material should typically be selected such that the appliance is stiff enough to apply sufficient force to the teeth but remains thin enough to be comfortably worn. In various embodiments, the multilayered polymeric film used to form the dental appliance has a thickness of less than about 1 mm, or less than about 0.8 mm, or less than about 0.5 mm. The thickness of the walls of the resulting appliance may be between 0.05 mm and 2 mm, or between 0.1 mm and 1 mm.

In various embodiments, particularly those including one or more semi-crystalline polymers, the dental appliance is substantially optically clear. The Expected light transmission can be determined by ISO 13468-1:2019 or ASTM D1003-13 using CIE illuminate C and the Expected haze can be determined using ISO 14782-1:1999 or ASTM D1003-13 using CIE illuminate C. The term "Expected" is used herein to indirectly represent the transmission and haze of a formed appliance, as the geometry (e.g., size and surface features) of the appliance is not conducive to direct testing. Instead, a representative polymeric film is subjected to the same temperature and processing conditions as would normally be used to create the appliance but without drawing the film down on a mold, allowing the film to remain sufficiently planar for subsequent testing.

Some embodiments have an Expected light transmission of at least about 50%. Some embodiments have an expected light transmission of at least about 75%. Some embodiments have an Expected haze of no greater than 15 or no greater than 10%. Some embodiments have an Expected haze of no greater than 5%. Some embodiments have an Expected haze of no greater than 2.5%. The Expected haze of dental appliance of certain presently preferred embodiments is less than 10% and the Expected light transmission of dental appliance is greater than 80%.

The polymeric film, the formed dental appliance, or both, may optionally be crosslinked with radiation chosen from ebeam, gamma, UV, and mixtures and combinations thereof.

In various embodiments, the polymeric film used to form the dental appliance has a thickness of less than about 1 mm, or less than about 0.8 mm, or less than about 0.65 mm.

In some embodiments, the polymeric film may be manufactured in a roll-to-roll manufacturing process, and may optionally be wound into a roll until further converting operations are required to form one or more dental appliances.

In some examples, the dental treatment system according to the present disclosure is provided to a dental practitioner in the form a kit including a series of orthodontic aligner trays such as shown in FIG. 2, as well as instructions for patient use. Suitable additional items for the kit, which are not intended to be limiting, include, one or more of a carrying case, a removal tool to help a patient remove the aligner from the teeth, a seating tool to assist forcing the aligners onto the teeth, a toothbrush, aligner tray cleaning tablets, powder/crystals, or gel/foam/liquid, abrasive papers or objects for addressing discomfort from sharp edges or corners on the dental appliance, a whitening gel or pen, dental floss, a dental pick, wax, and the like.

The devices of the present disclosure will now be further described in the following non-limiting examples.

EXAMPLES

The following Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, and the like in the Examples and the rest of the specification are provided on the basis of weight. Solvents and other reagents used may be obtained from Sigma-Aldrich Chemical Company (Milwaukee, WI) unless otherwise noted.

Materials

PETg: copolyester from Eastman Chemicals, Kingsport, TN, grade: Eastar GN071
PCTg: copolyester from Eastman Chemicals, grade: VM318
Tritan: copolyester from Eastman Chemicals, grade: MX710
Elvaloy: copolymer of ethylene and methyl acrylate: from DowDuPont, Midland, MI, grade: Elvaloy 1609
Pellethane: thermoplastic polyurethane from Lubrizol, Wickliffe, OH, grade 65D
Texin: thermoplastic polyurethane from Covestro, Pittsburgh, PA, grade RxT50D
Admer: thermoplastic elastomer (TPE) from Mitsui Chemicals America, Rye Brook, NY, grade SE810
Zeonor: thermoplastic cylcoolefin polymer (COP) from Zeon Chemicals, Louisville, KY, grade 1060R
Ecdel: copolyester elastomer available from Eastman Chemicals, grade: 9967

Properties of Selected Polyesters for Layers ABC

Properties of some of the polymeric materials used in the examples below are shown in Table 1 below.

TABLE 1

| | Tg (° C.) | Tm (° C.) | Vicat Softening Temperature (° C.) | Flexural Modulus (GPa) | Elongation at Break (%) | Solubility Parameter ($cal^{1/2} cm^{-3/2}$) |
|---|---|---|---|---|---|---|
| PETg | 80 | N/A | 76 | 2.1 | 180 | 9.36 |
| PCTg | 81 | N/A | 79 | 1.8 | 330 | 8.94 |
| Tritan | 110 | N/A | 110 | 1.55 | 185 | 9 |
| Pellethane | <0 | N/A | 107 | 0.22 | 450 | N/A |
| Texin | <0 | N/A | 128 | 0.11 | 480 | N/A |
| Ecdel | <0 | 205 | 170 | 0.15 | 400 | 8.9 |
| Elvaloy | <0 | 101 | 70 | 0.08 | 740 | 8.7 |
| Admer | <0 | N/A | 40 | <0.1 | >200 | N/A |
| Zeonor 1060R | 100 | N/A | 99 | 2.1 | 60 | N/A |

The solubility parameter in Table 1 was estimated according to the by the group contribution method outlined in Chapter 3 of Sperling, L. H., *Introduction to Physical Polymer Science,* John Wiley & Sons, Inc.: Hoboken, New Jersey, 2006.

Comparative Example 1

The manufacturers of some currently available orthodontic alignment trays have disclosed that a desired modulus range for delivering an effective tooth-moving force is about 0.1 GPa to about 1.5 GPa. Using various modulus values in these ranges, a bending stiffness factor of a 0.75 mm single layer film was calculated and displayed in Table 2 below. In Table 2, $Et^3$ is the bending stiffness factor of aligner film before thermoforming and $Etw^3$ is the bending stiffness factor of the aligner tray where $t_w$ is the wall thickness of the aligner tray at within 2 mm of the trimmed line of incisors on the labial side. The most probable thickness reduction near the trimmed line was assigned to be in the range of 40%-60% for the calculated bending stiffness factor ($Etw^3$) in Tables 2-5.

Table 2 below shows the calculated bending stiffness factors for 0.75 mm aligner films and thermoformed trays with 40%, 50% and 60% wall thickness reduction from polymers with different modulus of 0.1 GPa, 0.5 GPa, 0.8 GPa and 1.5 GPa.

Table 2 shows in pertinent part that: (1) 0.0027 GPa*$mm^3$ is the minimum bending stiffness factor required for an aligner tray to move teeth when the aligner's modulus is 0.1 GPa vs. 0.0135 GPa*$mm^3$ from the modulus of 0.5 GPa at 60% wall thickness reduction; and (2) the most probable desired bending stiffness factor for aligner tray is estimated in the range of 0.042 GPa*$mm^3$ to 0.079 GPa*$mm^3$ at 50% wall thickness reduction from modulus 0.8 GPa and 1.5 GPa. The wall thickness is assigned at within 2 mm of the trimmed line of incisors on the labial side of the appliance.

Comparative Examples 2 & 3

The bending stiffness factor of commercially available orthodontic aligner tray materials, aligner trays and orthodontic treatment system available under the trade designations SMARTTRACK from Align Technology, Inc., San Jose, CA (designated CE2 in Table 3) and ZENDURA FLX from Bay Materials, Fremont CA (CE3), were calculated at 50% wall thickness reduction, and the results are shown in Tables 3-4. The bending stiffness factors highlighted in columns 5-6 of Tables 3-4 are calculated from tensile modulus approximated by rule of mixing of each individual layer thickness and modulus, while the bending stiffness factors in columns 7-8 of Tables 3-4 are from flexural moduli calculated from a multilayer beam model. The calculated BSF of the SmartTrack materials falls right in the most probable desired range of 0.042 GPa*$mm^3$ to 0.079 GPa*$mm^3$ determined from Tables 2-5 above.

TABLE 2

Calculated Bending Stiffness Factor for CE1-1-CE1-4

| | Before thermoforming | | | 40% reduction in wall | 50% reduction in wall | 60% reduction in wall |
|---|---|---|---|---|---|---|
| Sample | Film Thickness (mm) | Modulus (GPa) | $Et^3$ (GPa*$mm^3$) | thickness $Et_w^3$ (GPa*$mm^3$) | thickness $Et_w^3$ (GPa*$mm^3$) | thickness $Et_w^3$ (GPa*$mm^3$) |
| CE1-1 | 0.75 | 0.1 | 0.042 | 0.0091 | 0.0052 | 0.0027 |
| CE1-2 | 0.75 | 0.5 | 0.211 | 0.0456 | 0.0264 | 0.0135 |
| CE1-3 | 0.75 | 0.8 | 0.338 | 0.0729 | 0.0422 | 0.0216 |
| CE1-4 | 0.75 | 1.5 | 0.633 | 0.1367 | 0.0791 | 0.0405 |

TABLE 3

Calculated bending stiffness factors for CE2

| CE2 (Layer Material) | Film Layer Thickness (mm) | Modulus (GPa) | $E_1 t_1^3$ (GPa*mm³) | $E_{ave} t^3$ (GPa*mm³) | $E_{ave} tw^3$ (GPa*mm³)* | $E_{ave} t^3$ (GPa*mm³) | $E_{ave} t_w^3$ (GPa*mm³)* |
|---|---|---|---|---|---|---|---|
| TPU | 0.075 | 0.60 | 0.0003 | 0.591 | 0.0738 | 0.4691 | 0.0586 |
| Copolyester | 0.60 | 1.6 | 0.3456 | | | | |
| TPU | 0.075 | 0.60 | 0.0003 | | | | |

*50% reduction in wall thickness after thermoforming

TABLE 4

Calculated bending stiffness factors for CE3

| CE3 (Layer Material) | Film Layer Thickness (mm) | Modulus (GPa) | $E_1 t_1^3$ (GPa*mm³) | $E_{ave} t^3$ (GPa*mm³) | $E_{ave} tw^3$ (GPa*mm³)* | $E_{ave} t^3$ (GPa*mm³) | $E_{ave} t_w^3$ (GPa*mm³)* |
|---|---|---|---|---|---|---|---|
| Copolyester | 0.2583 | 1.6 | 0.0276 | 0.5353 | 0.0669 | 0.7215 | 0.0902 |
| TPU | 0.2583 | 0.25 | 0.0043 | | | | |
| Copolyester | 0.2583 | 1.6 | 0.0276 | | | | |

*50% reduction in wall thickness after thermoforming

CE2 and CE3 were reportedly developed to replace previous commercially available harder (stiffer) single layer aligners for reducing modulus (stiffness at a given thickness) and degradation of the resilient positioning force applied to the teeth when the aligner is worn by the patient. These more elastic aligners have reported a significant reduction in pain with increased effectiveness and reduced treatments times due to their lower stiffness, better force persistence and improved strain recovery than their former single layer materials.

When the aligner is worn by the patient, it encapsulates the teeth and must provide both retention and activation to move the teeth. In general, the desired undercuts of the teeth provide the retention while the active component to move teeth by the elastic bending deformation of the aligner. And aligner's elastic bending force cannot be as great as to overcome the retention forces. The aligner trays in Tables 3-4 above are designed to accelerate tooth movement at reduced stiffness for improved patient comfort. Their activation force is more persistent, while maybe also very close to the retention forces due to their reduced stiffness. The combined effects can therefore result in effective (faster) movement in the early stage of the treatment, but less control in tailoring precise movement near the final stage to reach the projected position. Refinement will then be needed to move the teeth to the exact position as planned, which is very undesirable to orthodontists and patients.

Example 1

A single layer PETg film in the example below is the substrate used in orthodontic aligner trays available from 3M, St. Paul, MN. The PETg film was made by extrusion casting film process and had a thickness of 0.75 mm before thermoforming.

The PETg aligner tray was made from thermoforming against an arch made by 3D printing. The properties and bending stiffness factor of the single layer film is shown in Table 8 below.

TABLE 5

Thickness, Modulus and Bending Stiffness Factors of Single Layer PETg Film and Aligner Formed Therefrom

| Example 1 (Layer Material) | Film Layer Thickness (mm) | Modulus (GPa) | $Et^3$ (GPa*mm³) | $Et_w^3$ (GPa*mm³)* |
|---|---|---|---|---|
| PETG | 0.75 | 2 | 0.8438 | 0.1055 |

*50% reduction in wall thickness after thermoforming (at within 2 mm of the trimmed line of incisors)

Example 2

A 5-layer ABCBA (Tritan MX710/Ecdel 9967/Tritan MX710/ECDEL 9967/Tritan MX710) film was extruded using a pilot scale coextrusion line equipped with a feedblock and film die. The overall film sheet thickness was controlled at about 25 mils (0.625 mm).

The five layers film was then thermoformed against an arch made by 3D printing. Thermoforming temperatures were varied to alter the thickness of aligner tray.

The properties and calculated bending stiffness factors for the 5 layer material are displayed in Tables 6-7 below. The bending stiffness factors of the five layer film and aligner highlighted in Table 6 are calculated from tensile modulus approximated by a rule of mixing of each individual layer thickness and modulus, while the bending stiffness factors highlighted in Table 7 are determined from flexural modulus calculated from a multilayer beam model.

TABLE 6

Construction, Thickness, Modulus and Bending Stiffness Factors of 5-layer Film and Aligner Formed Therefrom

| Example 2 (layer material) | Film Thickness (mm) | Modulus (GPa) | $E_i t_i^3$ (GPa* mm³) | $E_{ave}t^3$ (GPa* mm³) | 50% reduction in wall thickness $E_{ave}t_w^3$ (GPa* mm³) | 45% reduction in wall thickness $E_{ave}t_w^3$ (GPa* mm³) | 40% reduction in wall thickness $E_{ave}t_w^3$ (GPa* mm³) | 35% reduction in wall thickness $E_{ave}t_w^3$ (GPa* mm³) |
|---|---|---|---|---|---|---|---|---|
| Tritan | 0.0694 | 1.6 | 0.0005 | 0.3147 | 0.0394 | 0.0524 | 0.0680 | 0.0865 |
| Ecdel | 0.0694 | 0.2 | 6.698E−05 | | | | | |
| Tritan | 0.3472 | 1.6 | 0.0670 | | | | | |
| Ecdel | 0.0694 | 0.2 | 6.698E−05 | | | | | |
| Tritan | 0.0694 | 1.6 | 0.0005 | | | | | |

15

TABLE 7

Construction, Thickness, Modulus and Bending Stiffness Factors of 5-layer Film and Aligner Formed Therefrom

| Example 2 (layer material) | Film Thickness (mm) | Modulus (GPa) | $E_i t_i^3$ (GPa* mm³) | $E_{ave}t^3$ (GPa* mm³) | 50% reduction in wall thickness $E_{ave}t_w^3$ (GPa* mm³) | 45% reduction in wall thickness $E_{ave}t_w^3$ (GPa* mm³) | 40% reduction in wall thickness $E_{ave}t_w^3$ (GPa* mm³) | 35% reduction in wall thickness $E_{ave}t_w^3$ (GPa* mm³) |
|---|---|---|---|---|---|---|---|---|
| Tritan | 0.0694 | 1.6 | 0.0005 | 0.2881 | 0.0360 | 0.0480 | 0.0622 | 0.0791 |
| Ecdel | 0.0694 | 0.2 | 6.698E−05 | | | | | |
| Tritan | 0.3472 | 1.6 | 0.0670 | | | | | |
| Ecdel | 0.0694 | 0.2 | 6.698E−05 | | | | | |
| Tritan | 0.0694 | 1.6 | 0.0005 | | | | | |

The single layer PETg aligner (Example 1) has higher bending stiffness factor (0.105 GPa*mm³) at within 2 mm of the trimmed line of incisors on the labial side and modulus (2 GPa), and therefore would be expected to provide better retention while moving teeth near the end of the treatment to minimize refinement need. On the other hand, the 5 layer aligner has better force persistence and lower modulus (<1.5 GPa), and therefore would be expected to deliver effective tooth movement at an earlier stage of the treatment.

The 5 layer film (Example 2) included a core layer having a bending stiffness factor greater than 0.02 GPa*mm³ and outer skin layers having a bending stiffness factor greater than 0.0001 GPa*mm³. Furthermore, the preferred thermoforming process window suggested greater than 35% reduction in wall thickness at within 2 mm of the trimmed line of incisors on the labial side for delivering effective elastic bending force with bending stiffness factor in the desired range of 0.036 GPa*mm³ to 0.079 GPa*mm³.

A suggested system and treatment plan could employ the 5 layer aligner to treat patients in the earlier stage of the treatment, while the single layer PETg aligner could be used in a later stage. Alternatively, the treatment plan may employ the single layer PETg aligner at an early stage, followed by a tray having a higher bending stiffness factor (e.g., the tray of Example 2) employed in a later stage. The treatment plan can include any number of alternating trays having different bending stiffness factors in any given pattern (e.g., ABBA, AABB, ABAB, ABAA, etc.). The combined treatment system can improve overall patient experience with a more predicable treatment outcome by minimizing refinement need.

Various embodiments of the invention have been described. These and other embodiments are within the scope of the following claims.

The invention claimed is:

1. A system for repositioning teeth of a patient from an initial tooth arrangement to a final tooth arrangement, the system comprising a plurality of incremental position adjustment appliances, each comprising a shell including an arrangement of cavities shaped to receive and reposition teeth of the patient, wherein the cavities in at least one appliance of the plurality of incremental adjustment appliances in the system have a different geometry than that of at least one other appliance in the system of the plurality of incremental adjustment appliances, and wherein at least two of the appliances in the system are successively worn by the patient to exert force on at least one tooth and move the teeth of the patient from a first arrangement to a successive arrangement different from the first arrangement, and wherein the plurality of incremental adjustment appliances comprises:

a first incremental position adjustment appliance including a first shell, the first shell having a bending stiffness factor less than about 0.1 GPa*mm³ as measured within 2 mm of a trimmed line of incisors on a labial side of the first shell, and an elastic modulus no greater than about 1.5 GPa, wherein the first shell is a multilayer shell that comprises:
a core layer with a first major surface and a second major surface, wherein the core layer has an elastic modulus of greater than about 1.3 GPa and a bending stiffness factor of greater than 0.02 GPa*mm³;
a first interior layer on the first major surface of the core layer, and a second interior layer on the second major surface of the core layer, wherein each of the first and the second interior layers have an elastic modulus of no greater than 0.5 GPa and a bending stiffness factor less than 0.001 GPa*mm³; and a first exterior layer on the first interior layer and a second exterior layer on the second interior layer, wherein the first and the second exterior layers each have an elastic modulus of greater than about 1.3 GPa and a bending stiffness factor less than 0.002 GPa*mm³; and a second incremental position adjustment appliance including a second shell with a bending stiffness factor of at least about 0.1 GPa*mm³ as measured within 2 mm of a trimmed line of incisors on a labial side of the second shell.

2. The system of claim 1, wherein the second shell has a bending stiffness factor of about 0.1 GPa*mm³ as measured within 2 mm of the trimmed line of incisors on the labial side of the shell, and an elastic modulus of about 2 GPa.

3. The system of claim 2, wherein the second shell comprises polycyclohexylenedimethylene terephthalate glycol (PCTg),), polyethylene terephthalate glycol (PETG), poly(1,4 Cyclohexylenedimethylene) Terephthalate (PCTA), and mixtures and combination thereof.

4. The system of claim 1, wherein:
the elastic modulus of the core layer is 1.55 GPa;
the elastic modulus of each of the first and second interior layers is 0.2 GPa; and
the elastic modulus of each of the first and second exterior layers is 1.55 GPa.

5. The system of claim 1, wherein the first exterior layer, the second exterior layer, and the core layer comprise the same thermoplastic polymer.

6. The system of claim 1, wherein the core layer, the first exterior layer, and second exterior layer each include a thermoplastic polymer, and wherein the thermoplastic polymers in each of the first and the second exterior layers and the core layer comprise a polyester or a copolyester.

7. The system of claim 6, wherein the polyester is independently chosen from polyethylene terephthalate (PET), polyethylene terephthalate glycol (PETg), polycyclohexylenedimethylene terephthalate (PCT), polycyclohexylenedimethylene terephthalate glycol (PCTg), poly(1,4 Cyclohexylenedimethylene) Terephthalate (PCTA), 2,2,4,4-tetramethyl-1,3-cyclobutanediol modified polycyclohexylenedimethylene terephthalate and mixtures and combinations thereof.

8. The system of claim 7, wherein the polyester is chosen from PCTg, PETg, PCTA, 2,2,4,4-tetramethyl-1,3-cyclobutanediol modified polycyclohexylenedimethylene terephthalate, and mixtures and combinations thereof.

9. The system of claim 4, wherein the first and the second interior layers each comprise a thermoplastic polymer independently chosen from copolyester ether elastomers, copolymers of ethylene and (meth)acrylates, ethylene methyl-acrylates, ethylene ethyl-acrylates, ethylene butyl acrylates, maleic anhydride modified polyolefin copolymers, methacrylic acid modified polyolefin copolymers, ethylene vinyl alcohol (EVA) polymers, styrenic block copolymers, ethylene propylene copolymers, and thermoplastic polyurethanes (TPU).

10. The system of claim 9, wherein the thermoplastic polymer in the first and the second interior layers each comprise a copolyester ether elastomer.

11. The system of claim 9, wherein the thermoplastic polymers in the first and the second interior layers each comprise a ethylene methyl-acrylate.

12. The system of claim 9, wherein the thermoplastic polymers in the first and the second interior layers each comprise a thermoplastic polyurethane.

13. A system for repositioning teeth of a patient from an initial tooth arrangement to a final tooth arrangement, the system comprising a series of polymeric shells, wherein the polymeric shells each comprise an arrangement of cavities configured to receive one or more teeth in an upper arch or a lower arch of the patient and apply a resilient positioning force to cause a predetermined incremental movement of one or more teeth from a first position to a second position, wherein the polymeric shells in the series comprise:

a first multilayer shell with a bending stiffness factor less than about 0.1 GPa*mm³ as measured within 2 mm of a trimmed line of incisors on a labial side of the first shell, and an elastic modulus no greater than about 1.5 GPa, wherein the first multilayer shell comprises:

a core layer with a first major surface and a second major surface, wherein the core layer has an elastic modulus of greater than 1.3 GPa;

a first interior layer on the first major surface of the core layer, and a second interior layer on the second major surface of the core layer, wherein each of the first and the second interior layers have an elastic modulus of less than 0.5 GPa; and a first exterior layer on the first interior layer and a second exterior layer on the second interior layer, wherein the first and the second exterior layers each have an elastic modulus of greater than 1.3 GPa; and a second shell with a bending stiffness factor greater than 0.1 GPa*mm³ as measured within 2 mm of a trimmed line of incisors on a labial side of the second shell.

* * * * *